Oct. 9, 1956     E. W. HERTENSTEIN, JR., ET AL     2,765,910

METHODS OF AND APPARATUS FOR EXTRUDING LEAD

Filed April 30, 1952     2 Sheets-Sheet 1

INVENTORS
E. W. HERTENSTEIN, JR.
E. J. LARSEN
BY
ATTORNEY

Oct. 9, 1956　　E. W. HERTENSTEIN, JR., ET AL　　2,765,910
METHODS OF AND APPARATUS FOR EXTRUDING LEAD
Filed April 30, 1952　　　　　　　　　　　　　　2 Sheets-Sheet 2

INVENTORS
E. W. HERTENSTEIN, JR.
E. J. LARSEN
BY [signature]
ATTORNEY

United States Patent Office 2,765,910
Patented Oct. 9, 1956

2,765,910

METHODS OF AND APPARATUS FOR EXTRUDING LEAD

Edgar W. Hertenstein, Jr., Towson, and Elmer J. Larsen, Parkville, Md., assignors to Western Electric Company, Incorporated, New York, N. Y., a corporation of New York Application April 30, 1952, Serial No. 285,284

6 Claims. (Cl. 207—2)

This invention pertains to methods of and apparatus for extruding lead, and more particularly to methods of and apparatus for preventing leakage lead from interfering with bearings and other vital parts of an extruding apparatus.

A typical extruding apparatus, used in the manufacture of lead-sheathed electrical cables, is the Pirelli type press illustrated and described in Patent 2,076,200 to R. E. Horley. This apparatus includes stationary inner and outer cylindrical members between which is coaxially and rotatably mounted a cylindrical, screw-threaded impeller. Molten lead, or a lead alloy, is fed through an opening in the outer cylindrical member to the impeller, which is rotated to urge the metal forward through a die located at the exit end thereof. Since lead and lead alloys act substantially alike in such presses, the metal being treated will be referred to hereinafter as "lead," with the understanding that lead alloys also are intended unless expressly excluded.

A great deal of difficulty has been experienced with a leakage of the lead, which occurs through the running clearances provided between the rear unthreaded portion of the impeller and the stationary outer and inner cylindrical members. By chilling a small section of the impeller in this region, the leakage lead tends to solidify and under ideal conditions there would be no further difficulties afforded thereby, since upon solidification thin cylinders of lead would form in the clearances and prevent further leakage. However, due to various factors unavoidably present in the apparatus, such as a slight eccentricity and out-of-roundness of the impeller, a great amount of heat due to friction is generated in this region. Consequently, globules of molten lead and strips of heated lead work their way through the clearances aided by the slight static head of the lead being introduced to the impeller. The leakage lead solidifies and works its way backward into the bearings and other vital parts of the apparatus where it may interfere with the proper functioning of the apparatus and cause serious damage when it becomes wedged between the bearings and their races.

It is an object of this invention to provide new and improved methods of and apparatus for extruding lead.

Another object of the invention is to provide new and improved methods of and apparatus for continuously extruding lead and lead alloys.

It is a further object of this invention to provide new and improved methods of an apparatus for preventing leakage lead from interfering with bearings and other vital parts of an extruding apparatus.

Other objects and features of this invention will become apparent as the specification proceeds.

A method illustrating certain features of the invention may include introducing a cooling fluid into an extruding apparatus in such a manner as to contact molten leakage lead as it escapes through clearances between moving parts of the apparatus. The cooling fluid embrittles a substantial part of the leakage lead and renders it readily removable from the apparatus.

An apparatus illustrating certain features of this invention may include a barrel provided with a bore having a rotatable impeller positioned therein. The front portion of the impeller is provided with threads, and the rear portion of the impeller is unthreaded and fits closely within the bore. Means are provided for rotating the impeller to force molten lead through the bore until it is extruded from the exit end thereof. A fluid under pressure is introduced to the interior of the apparatus so as to contact leakage lead which may escape backwardly between the unthreaded portion of the impeller, thereby causing a substantial amount of the leakage lead to become embrittled and exhausted therefrom.

A complete understanding of the invention may be obtained from the following detailed description of methods and apparatus forming specific embodiments thereof, when read in conjunction with the appended drawings, in which.

Figure 1:
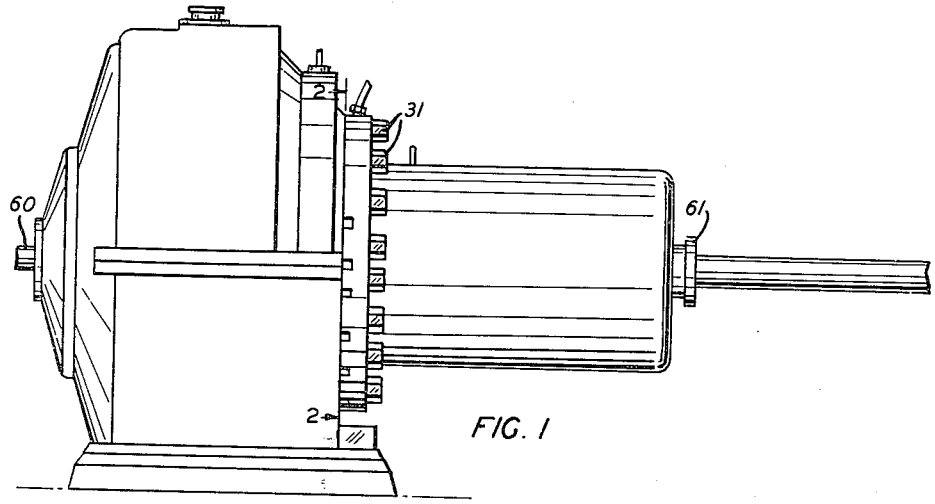
Fig. 1 is a side elevational view of an extruding apparatus embodying certain features of the invention.
Figure 2:
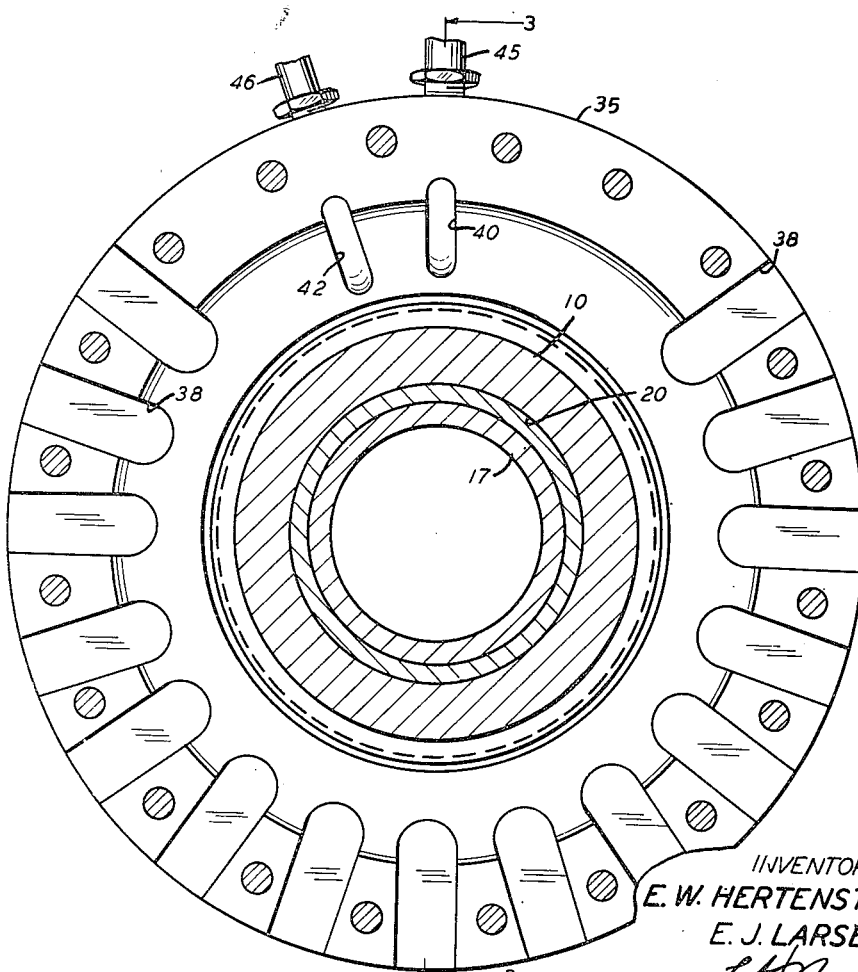
Fig. 2 is an enlarged vertical section taken along line 2—2 of Fig. 1 with the electrical cable omitted for clarity.
Figure 3:
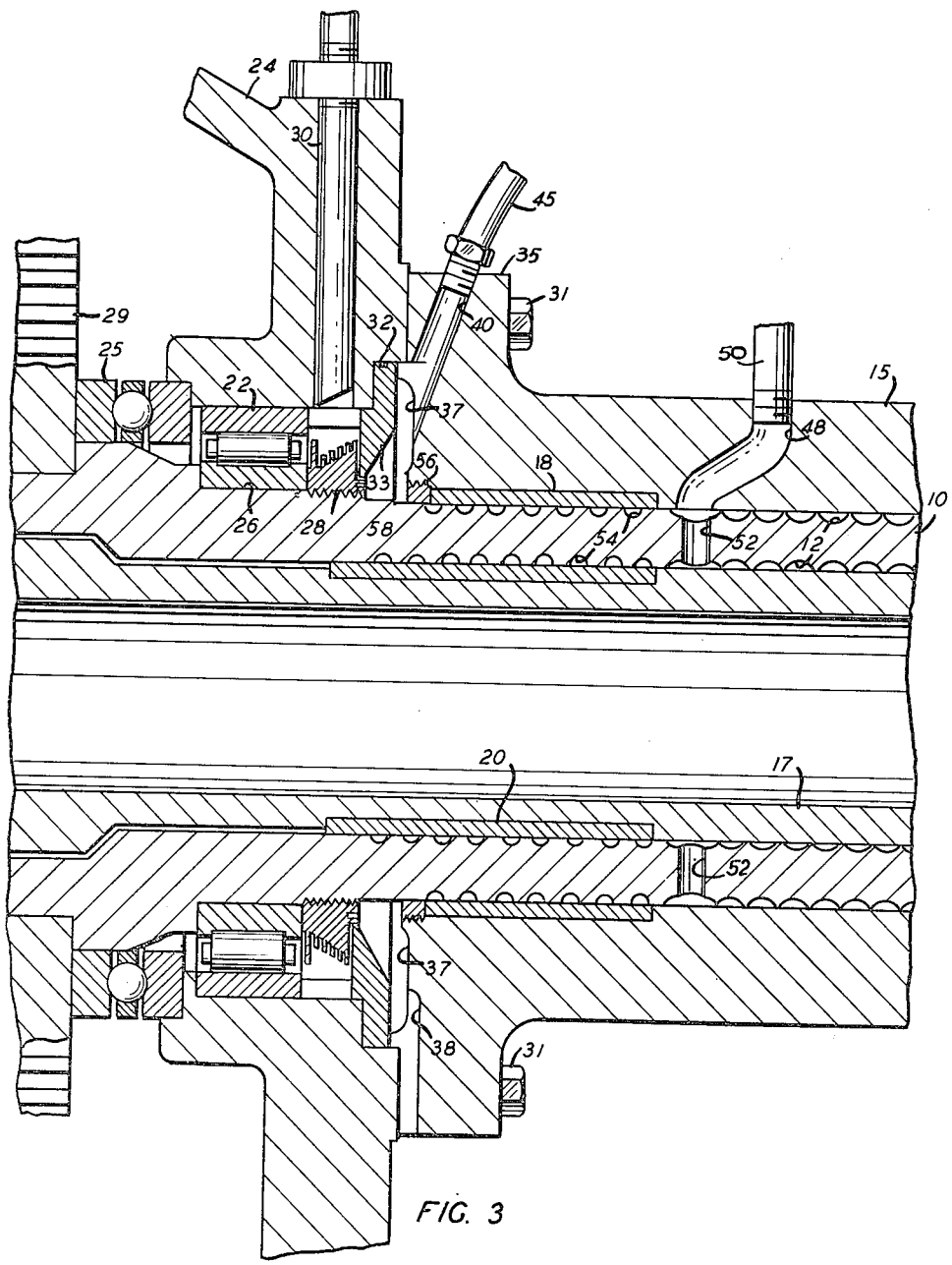
Fig. 3 is a further enlarged, fragmentary, vertical section taken along line 3—3 of Fig. 2.

Referring now to the drawings, the extruding apparatus illustrated in Fig. 1 includes a rotatable, screw-type, cylindrical impeller 10 (Fig. 3), the right-hand portion of which is provided with helical threads 12—12 on both the inner and outer surfaces thereof. The impeller 10 is mounted for rotation between a flanged barrel 15 and an elongated stationary sleeve 17. A sleeve bushing 18 and a split bushing 20 positioned between the unthreaded portion of the impeller 10, and the barrel 15 and sleeve 17, respectively, afford bearing surfaces for the rotating impeller 10.

The unthreaded portion of the impeller 10 is prolonged and projects from the flanged end of the barrel 15, through bushings 18 and 20, into a bore 22 provided in a housing 24. The impeller 10 is supported by a thrust bearing 25 and radial roller bearing 26 which are positioned within the bore 22. The roller bearing 26 is retained within a recess on the impeller 10 by an annular labyrinth flange 28 threadedly mounted on the impeller. A suitable driving means (not shown) mounted within the housing 24, is operatively connected to the impeller for rotation thereof, by a gear 29 fixedly keyed thereto. A lubrication inlet pipe 30 is utilized to supply lubrication oil, as required, to the bearings 25 and 26.

The flanged end of the barrel 15 is secured to the face of the housing 24 by stud bolts 31—31 spaced about the periphery thereof. The portion of the bore 22 adjacent to the flanged end of the barrel 15 is provided with a counterbore 32 designed to receive an annular baffle 33. The flanged end of the barrel 15 has its inner face 35 provided with an annular channel 37 which communicates with the clearance between the sleeve bushing 18 and the adjacent unthreaded portion of the impeller 10. A plurality of spaced, radial slots 38—38 formed in the face 35 intersect the channel 37 and provide access to the channel 37 from the outer periphery of the flanged end of the barrel 15.

Passages 40 and 42 formed in the top of the flanged end of the barrel 15 communicate with the channel 37 and provide an entry port for a suitable fluid medium hereinafter to be described. Conduits 45 and 46 connected to the passages 40 and 42, respectively, communicate with the fluid medium supply (not shown) from which the fluid medium is supplied through the passages to the interior channel 37.

The barrel 15 is provided with a lead inlet port 48 through which molten lead is introduced by means of a pipe 50 to the interior of the barrel and the impeller 10. Apertures 52—52 in the impeller provide access of the molten lead to the inner threaded surface thereof.

The unthreaded portion of the impeller 10 in the vicinity adjacent to the bushings 18 and 20 is provided with annular grooves 54—54 on both the inner and outer surfaces thereof. The purpose of the grooves 54—54 is to aid the formation of lead seals, which are thin cylinders of solidified lead formed in the clearances between the outer and inner surfaces of the impeller 10 and the bushings 18 and 20, respectively. An annular collar 56 is threadedly received in a threaded counterbore 58 provided in the flanged end of the barrel 15 and serves to removably retain the bushing 18 in place.

Operation

During an extruding operation, an unsheathed electrical cable 60 is advanced through the stationary sleeve 17 toward a die shown generally at 61 positioned at the exit end of the barrel 15. The cable is enveloped in the throat of the die by a plastic sheath of lead, which has been urged forward by the rotating impeller 10. Molten lead is continuously supplied from the pipe 50 through the inlet port 48 in the barrel under a static head of approximately 30 p. s. i.

It is well known that lead in a molten state exhibits a marked propensity for leaking through extremely small constrictions. This characteristic of molten lead is demonstrated by the fact that some of the lead which enters through the inlet port 48 seeps through the clearances between the bushings 18 and 20 and the outer and inner surfaces, respectively, of the unthreaded portion of the impeller 10. Since it has been found that a small amount of leakage through the clearance between the bearing 20 and the inner surface of the unthreaded portion of the impeller 10 may be tolerated without causing difficulties, it will not be necessary to deal further with its effect. However, leakage of lead past the lead seal that forms in the clearance between the bushing 18 and the impeller 10 presents serious difficulties.

As the impeller 10 rotates continuously to extrude the lead sheath upon the advancing cable core, a large amount of heat is generated by friction between the bushing 18, the impeller 10 and the thin cylinder of lead, which forms the lead seal interposed therebetween. In the course of a prolonged operation small globules of molten lead and hot slivers of plastic lead make their way through the clearance toward the cavity formed by the counterbore 32, and the annular channel 37.

At the start of the extruding operation an operator actuates a valve (not shown) to introduce continuous streams of compressed air to the annular channel 37 via the conduits 45 and 46, and the passages 40 and 42. The compressed air, supplied from a suitable reservoir (not shown), is brought into contact with globules of molten leakage lead and near molten slivers thereof as they escape past the lead seal between the bushing 18 and impeller 10. Thereupon, due to the elevated temperature of the lead, a rapid oxidation thereof take place. It has been found that a substantial part of the leakage lead is transformed into a finely powdered oxide and blown out through the radial slots 38—38 along with small incompletely oxidized slivers of lead.

The continuous streams of compressed air also tend to cool the impeller 10 in the region of the bushings 18 and 20 by carrying away a substantial amount of the heat generated by friction. This cooling effect appreciably reduces the amount of leakage lead escaping through the lead seals.

Hence, the compressed air serves a threefold purpose, namely, a reduction in the amount of leakage lead due to the cooling effect, oxidation and disintegration of a substantial part of the leakage lead, and removal of the oxide particles and partially oxidized residue from the cavity formed by the counterbore 32 and channel 37 to the exterior of the apparatus.

Due to the presence of the finely divided particles of lead oxide, it has been found necessary to enclose the slots completely with a protective collector (not shown), which is provided with a filtered exhaust for the escaping air. The collector prevents the escape of the lead oxide to the atmosphere where it might be injurious to the health of operators.

Although the use of compressed air as a fluid medium has unique advantages, it has been found that various other fluid mediums may be utilized with beneficial results. For example, the cavity formed by the counterbore 32 and the channel 37 may be continuously flushed with a voluminous flow of oil, which is caused to enter the cavity under pressure via conduits 45 and 46, the passages 40 and 42, and the channel 37. A suitable oil reservoir (not shown) having an associated fluid pump (not shown) may be provided to function as a supply and circulating means and may be connected to the conduits 45 and 46.

The oil upon entering the cavity contacts the globules of molten lead and hot plastic lead slivers causing them to be immediately cooled and solidified. Due to the intense heat in the extruder, a considerable portion of the oil is carbonized. The leakage lead solidified by cooling in contact with the oil becomes very brittle and crusty because of the contamination thereof due to the inclusion of substantial amounts of carbon from the carbonized oil. This contaminated, carbonaceous lead residue crumbles readily and is flushed out with the continuous discharge of oil from the spaced slots 38—38 formed in the flanged end of the barrel 15. The oil and carbonaceous lead residue are discharged from the slots 38—38 into a screened sump (not shown) located beneath the barrel 15. The oil is cleaned, transferred to the reservoir and recirculated through the apparatus as previously described.

In addition, the circulating oil serves to carry away a large amount of the friction-generated heat in the region of the clearances between bushings 18 and 20 and the impeller 10, which appreciably reduces the quantity of leakage lead which escapes therebetween.

It is manifest that various modifications may be made without departing from the scope of this invention.

What is claimed is:

1. The method of preventing leakage lead from interfering with the operation of a lead extruding apparatus, which comprises introducing a sufficient quantity of compressed air into the apparatus into intimate contact with the molten leakage lead as it escapes through clearances between moving parts of the extruding apparatus to oxidize substantially all of the leakage lead, and ejecting the oxidized lead from the interior of the apparatus with the exhausted air.

2. The method of preventing leakage lead from interfering with the operation of a lead extruding apparatus, which comprises introducing into intimate contact with the molten leakage lead as it escapes through clearances between moving parts of the extruding apparatus a sufficient quantity of oil capable of transforming substantially all of the leakage lead into a brittle carbonaceous lead residue which crumbles readily, and flushing the crumbled carbonaceous lead residue from the interior of the apparatus.

3. A lead extruding apparatus, which comprises a barrel having a longitudinally extending bore and being provided with a flanged portion at one end, said flanged portion having formed therein an annular channel communicating with the bore and a plurality of radial slots communicating with said channel and providing access thereto from the outer periphery of the flanged portion of the barrel, a rotatable impeller positioned within the bore and having a front portion thereof provided with helical threads and the rear portion thereof unthreaded and fitting closely within the bore at the flanged end of the barrel, means for rotating the impeller to force molten lead through the bore until it is extruded from the exit end thereof, and means for supplying compressed air to the annular channel formed in the flanged portion of the barrel to oxidize a substantial part of the leakage lead that may escape backwardly between the unthreaded portion of the impeller and the barrel and eject the oxidized lead through the radial slots to the exterior of the apparatus.

4. A lead extruding apparatus, which comprises a barrel having a longitudinally extending bore and being provided with a flanged portion at one end, said flanged portion having formed therein an annular channel communicating with the bore and a plurality of radial slots communicating with said channel and providing access thereto from the outer periphery of the flanged portion of the barrel, a rotatable impeller positioned within the bore and having a front portion thereof provided with helical threads and the rear portion thereof unthreaded and fitting closely within the bore at the flanged end of the barrel, means for rotating the impeller to force molten lead through the bore until it is extruded from the exit end thereof, and means for supplying a continuous and voluminous flow of oil to the annular channel formed in the flanged portion of the barrel, the oil intermingling with any leakage lead that may escape backwardly between the unthreaded portion of the impeller and the barrel, thereby cooling and embrittling the leakage lead whereupon it is flushed through the radial slots to the exterior of the apparatus.

5. The method of preventing leakage lead from interfering with the operation of a lead extruding apparatus, which comprises introducing into intimate contact with molten leakage lead as it escapes through clearances between relatively moving parts of the apparatus a single fluid medium of the group consisting of air and an oil capable of causing the lead to solidify into a brittle residue in sufficient quantity to embrittle substantially all of the leakage lead, and removing the embrittled lead residue from the interior of the apparatus.

6. A lead extruding apparatus, which comprises a barrel having a longitudinally extending bore and being provided with a flanged portion at one end, said flanged portion having formed therein an annular channel communicating with the bore and a plurality of radial slots communicating with said channel and providing access thereto from the outer periphery of the flanged portion of the barrel, a rotatable impeller positioned within the bore the rear portion of which fits closely within the bore at the flanged end of the barrel, means for rotating the impeller to force molten lead through the bore, and means for supplying a continuous and voluminous flow of a fluid medium to the annular channel formed in the flanged portion of the barrel, said fluid medium being capable of causing the lead to solidify into a brittle residue, whereby a substantial part of the leakage lead that may escape rearwardly between the unthreaded portion of the impeller and the barrel is embrittled and flushed through the radial slots to the exterior of the apparatus.

References Cited in the file of this patent

UNITED STATES PATENTS

| | | |
|---|---|---|
| 1,882,757 | Boynton | Oct. 18, 1932 |
| 1,981,130 | Underwood | Nov. 20, 1934 |
| 2,076,199 | Horley | Apr. 6, 1937 |
| 2,076,200 | Horley | Apr. 6, 1937 |
| 2,142,526 | Norris | Jan. 3, 1939 |

FOREIGN PATENTS

| | | |
|---|---|---|
| 507,364 | Great Britain | June 14, 1939 |